Figure 1:
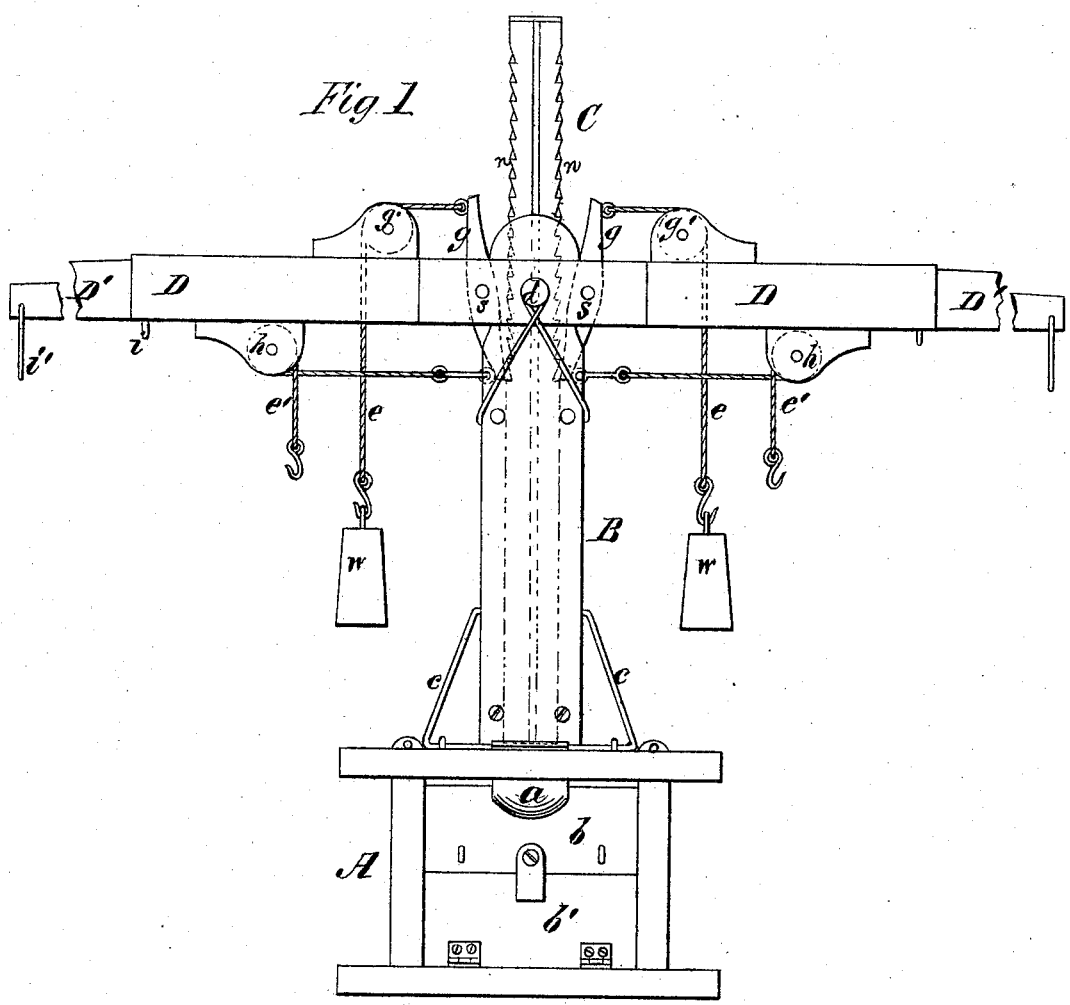

T. R. JACKSON.
Cotton-Presses.

No. 143,349.

2 Sheets--Sheet 1.

Patented September 30, 1873.

Witnesses.
R. T. Campbell.
J. H. Campbell.

Inventor
T. R. Jackson
by
Mason, Fenwick & Lawrence

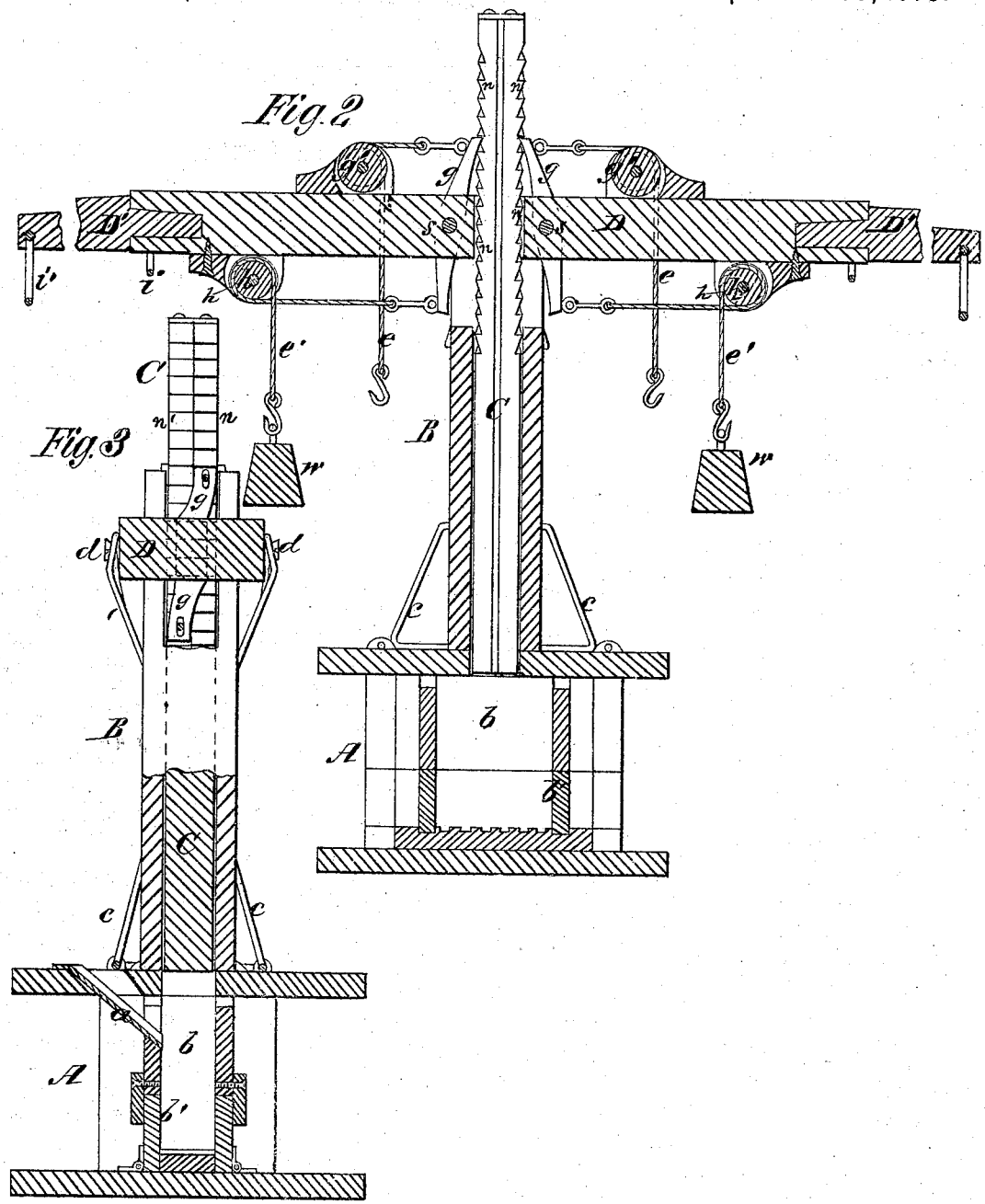

UNITED STATES PATENT OFFICE.

THOMAS R. JACKSON, OF DALLAS, TEXAS.

IMPROVEMENT IN COTTON-PRESSES.

Specification forming part of Letters Patent No. 143,349, dated September 30, 1873; application filed June 17, 1873.

*To all whom it may concern:*

Be it known that I, THOMAS R. JACKSON, of Dallas, in the county of Dallas and State of Texas, have invented a new and Improved Baling-Press; and I do hereby declare that the following is a full, clear, and exact description thereof, reference being had to the accompanying drawings making part of this specification, in which—

Figure 1, Plate 1, is an elevation of the front of my press, showing the double pawls adjusted for depressing the follower. Fig. 2, Plate 2, is a vertical section through the press, showing the pawls adjusted for raising the follower. Fig. 3, Plate 2, is a sectional side view of the press.

This invention relates to presses for baling cotton, hay, and other products; and has for its object the employment of double pawls or dogs diagonally on opposite sides of a follower-rack, having two rows of teeth on each side, saids pawls or dogs being pivoted to a vibrating lever, and provided with cords or chains and changeable weights, whereby the dogs serve the twofold purpose of raising as well as depressing the follower, as will be hereinafter explained.

The following description of my invention will enable others skilled in the art to understand it.

In the accompanying drawings, A represents a rectangular press-box, which consists of upper and lower removable sides $b$ $b'$, applied in a strong frame, from which rises, vertically, a hollow shaft, B. This shaft B is rigidly secured upon the frame of the press-box A, and held down thereon by means of braces $c$, so as to serve as a guide for a follower-rod, C, which is allowed to move up and down freely therein. The follower-rod C has two vertical rows of teeth, $n$ $n'$, on opposite sides of it, one row of which is pitched upward and the other downward, as represented in the drawings, Fig. 1. D represents a lever, which has its fulcrum $d$ near the upper end of the hollow shaft B, and is allowed to vibrate in a vertical plane. To the lever D I pivot, at $s$ $s$, two pawls or dogs, $g$ $g$, the upper extremities of which are designed for engaging with the downwardly-pitched teeth $n$, and the lower extremities are adapted for engaging with the upwardly-pitched teeth $n'$. To the upper ends of the pawls or dogs $g$ $g$ I attach cords or chains $e$, which pass over pulleys $g'$ $g'$ on the upper side of the lever D, thence down through this lever; and to the lower ends of these cords or chains hooks are fastened for the attachment of weights $w$ $w$, as shown in Fig. 1. To the lower ends of these pawls or dogs $g$ $g$ cords or chains $e$ $e$ are attached, which are pressed around pulleys $h$ $h$ on the lower sides of lever D, and have hooks fastened to them for the attachment of the weights $w$ $w$.

The press-box having been filled through the chute $a$, the follower-rod C is forcibly brought down by hanging the weights $w$ $w$ on the hooks of the cords or chains $e$ $e$ and vibrating the lever D. When the material is pressed and bound, the weights $w$ $w$ are changed from the hooks on cords $e$ $e$ to those on cords $e'$ $e'$, and the lever D is again vibrated, which raises the follower-rod. By thus changing the weights from one pair of cords to the other, the pawls are adjusted in proper position for engaging with teeth on the rod C for moving this rod either up or down.

I am aware that it is not new to employ two rows of teeth, reversely set, upon the follower-rod of a press, and to combine with the said teeth two pairs of pawls, the respective pawls of each pair having independent pivots to swing upon; but I am not aware that diagonally-set pawls, constructed as I have shown, to alternately become elevating and depressing pawls, and combined with changeable weights and with cords, have ever been employed in combination with a follower and rod.

Having described my invention, what I claim as new, and desire to secure by Letters Patent, is—

The combination of diagonally-arranged double-acting pawls $g$, follower-rod C, with two rows of reverse-set teeth, $n$ $n'$, cords $e$ $e'$, changeable weights $w$ $w$, and vibrating lever D, substantially as and for the purpose set forth.

THOMAS RIVERS JACKSON.

Witnesses:
  THOS. J. FROW,
  WM. H. MCKNIGHT.